United States Patent
Ganta et al.

(10) Patent No.: US 9,921,958 B2
(45) Date of Patent: *Mar. 20, 2018

(54) EFFICIENTLY USING MEMORY FOR JAVA COLLECTION OBJECTS

(71) Applicant: International Business Machines Corporation, Armonk, NY (US)

(72) Inventors: Guru C. Ganta, Bangalore (IN); Gireesh Punathil, Kuthuparamba (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,262

(22) Filed: Jan. 10, 2017

(65) Prior Publication Data

US 2017/0161186 A1 Jun. 8, 2017

Related U.S. Application Data (63) Continuation of application No. 15/132,390, filed on Apr. 19, 2016, which is a continuation of application No. 14/961,967, filed on Dec. 8, 2015.

(51) Int. Cl.
*G06F 12/02* (2006.01)
*G06F 9/455* (2018.01)

(52) U.S. Cl.
CPC ...... *G06F 12/0253* (2013.01); *G06F 9/45558* (2013.01)

(58) Field of Classification Search
CPC .................. G06F 12/0253; G06F 9/45558
See application file for complete search history.

(56) References Cited

U.S. PATENT DOCUMENTS 5,953,527 A 9/1999 Cable
7,853,628 B1 * 12/2010 Fresko ................ G06F 12/0276
707/819

(Continued)

OTHER PUBLICATIONS

Arrenbrecht et al., "Shrinking HashMaps (was Re: Proposal: Better HashMap.resize( ) when memory is tight)," mail.openjdk.java.net Mailing Lists, Nov. 22, 2007, p. 1-3, Oracle Corporation, http://mail.openjdk.java.net/pipermail/core-libs-dev/2007-November/000122.html, Accessed on Oct. 1, 2015.

(Continued)

*Primary Examiner* — Rocio Del Mar Perez-Velez
(74) *Attorney, Agent, or Firm* — Michael O'Keefe (57) ABSTRACT

A method for collection instance resizing. The method may include identifying at least one collection object within a collection framework of a virtual machine. The method may also include determining the at least one identified collection object satisfies at least one preconfigured criteria. The method may further include determining a garbage collection cycle count associated with the at least one identified collection object exceeds a preconfigured threshold. The method may also include determining an occupancy ratio associated with the at least one identified collection object is less than a preconfigured shrink threshold. The method may further include restructuring the at least one identified collection object based on the at least one identified collection object satisfying the at least one preconfigured criteria, the garbage collection cycle count exceeding the preconfigured threshold, and the occupancy ratio being less than the preconfigured shrink threshold.

1 Claim, 7 Drawing Sheets

(56) References Cited

U.S. PATENT DOCUMENTS

| 8,374,978 | B2 | 2/2013 | Shacham et al. |
|---|---|---|---|
| 2007/0016634 | A1 | 1/2007 | Sekiguchi et al. |
| 2009/0013017 | A1* | 1/2009 | Branda ............... G06F 12/0253 |
| 2011/0066885 | A1 | 3/2011 | Reynolds |
| 2014/0240335 | A1 | 8/2014 | Hu et al. |
| 2015/0113202 | A1 | 4/2015 | McDougall et al. |
| 2015/0128147 | A1 | 5/2015 | Holt |
| 2016/0140036 | A1 | 5/2016 | O'Meara et al. |
| 2016/0283370 | A1 | 9/2016 | Kumpera et al. |
| 2017/0102979 | A1 | 4/2017 | Ramirez et al. |

OTHER PUBLICATIONS

Google et al., "sparsehash," GitHub—Sparsehash Repository, Last Modified on Feb. 23, 2012, p. 1-3, GitHub Inc., https://github.com/sparsehash/sparsehash, Accessed on Oct. 1, 2015.

Gross et al., "Shrinking an ArrayList to a new size," Stack Overflow, Jul. 26, 2009, p. 1-3, Stack Exchange Inc., http://stackoverflow.com/questions/1184636/shrinking-an-arraylist-to-a-new-size, Accessed on Oct. 1, 2015.

IBM, "Method and Apparatus for Self Optimizing Data Structures," An IP.com Prior Art Database Technical Disclosure, Jan. 5, 2007, p. 1-4, IP.com No. IPCOM000144718D.

McKenney et al., "Other Resizable Hash Tables," Is Parallel Programming Hard, and, If so, What Can You Do About It?, Last Modified on Mar. 17, 2014, p. 1-5, Chapter 12, Subsection 12.4.4, http://circe.tux.org/perfbook_html/node233.html, Accessed on Oct. 1, 2015.

Mell et al., "The NIST Definition of Cloud Computing," National Institute of Standards and Technology, Sep. 2011, p. 1-3, Special Publication 800-145.

Micay et al., "automatic shrinking of hash table capacity is very expensive," GitHub—The Rust Programming Language, Sep. 29, 2014, p. 1-2, Issue No. 17645, GitHub Inc., https://github.com/rust-lang/rust/issues/17645, Accessed on Oct. 1, 2015.

Oracle, "Class ArrayList<E>," Java Platform SE 6 Documentation, p. 1-12, http://docs.oracle.com/javase/6/docs/api/java/util/ArrayList.html#trimToSize%28%29, Accessed on Oct. 1, 2015.

SSFNet, "Class ShrinkableHashMap," SSF.OS.NetFlow, p. 1-3, SSF Research Network, http://www.ssfnet.org/javadoc/SSF/OS/NetFlow/ShrinkableHashMap.html, Accessed on Oct. 1, 2015.

Triplett et al., "Resizable, Scalable, Concurrent Hash Tables via Relativistic Programming," USENIX ATC '11, Jun. 14-17, 2011, p. 1-14.

Van Der Ploeg et al., "A Concurrent Hashtable," CodePlex, Last Modified on Sep. 26, 2009, p. 1-2, Microsoft, https://ch.codeplex.com/, Accessed on Oct. 1, 2015.

Xian et al., "Garbage Collection: Java Application Servers' Achilles Heel," Science of Computer Programming, Sep. 11, 2007, p. 1-37.

IBM, "List of IBM Patents or Patent Applications Treated as Related (Appendix P)," Feb. 27, 2017, p. 1-2.

Ganta et al., "Efficiently Using Memory for Java Collection Objects," Application and Drawings, Filed on Dec. 8, 2015, 46 Pages, U.S. Appl. No. 14/961,967.

Ganta et al., "Efficiently Using Memory for Java Collection Objects," Application and Drawings, Filed on Apr. 19, 2016, 43 Pages, U.S. Appl. No. 15/132,390.

Ganta et al., "Efficiently Using Memory for Java Collection Objects," Application and Drawings, Filed on Jan. 10, 2017, 43 Pages, U.S. Appl. No. 15/402,260.

* cited by examiner

EFFICIENTLY USING MEMORY FOR JAVA COLLECTION OBJECTS

BACKGROUND

The present invention relates generally to the field of computing, and more particularly to virtual machine garbage collection.

Garbage collection in a virtual machine environment, such as a Java virtual machine (JVM), relates to an automatic process that manages runtime memory used by programs. Garbage collection may relieve programmer overhead required to deallocate resources in a program. The Java collections framework provides an efficient organization and utilization of real world data and JVM provides efficient allocation and deallocation mechanisms. The Java collections framework may be a group of classes and interfaces implementing a set of frequently used and reusable data structures.

SUMMARY

According to one embodiment, a method for collection instance resizing. The method may include identifying at least one collection object within a collection framework of a virtual machine. The method may also include determining the at least one identified collection object satisfies at least one preconfigured criteria. The method may further include determining a garbage collection cycle count associated with the at least one identified collection object exceeds a preconfigured threshold. The method may also include determining an occupancy ratio associated with the at least one identified collection object is less than a preconfigured shrink threshold. The method may further include restructuring the at least one identified collection object based on the at least one identified collection object satisfying the at least one preconfigured criteria, the garbage collection cycle count exceeding the preconfigured threshold, and the occupancy ratio being less than the preconfigured shrink threshold.

According to another embodiment, a computer system for collection instance resizing. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include identifying at least one collection object within a collection framework of a virtual machine. The computer system may also include determining the at least one identified collection object satisfies at least one preconfigured criteria. The computer system may further include determining a garbage collection cycle count associated with the at least one identified collection object exceeds a preconfigured threshold. The computer system may also include determining an occupancy ratio associated with the at least one identified collection object is less than a preconfigured shrink threshold. The computer system may further include restructuring the at least one identified collection object based on the at least one identified collection object satisfying the at least one preconfigured criteria, the garbage collection cycle count exceeding the preconfigured threshold, and the occupancy ratio being less than the preconfigured shrink threshold.

According to yet another embodiment, a computer program product for collection instance resizing. The computer program product may include one or more computer-readable storage devices and program instructions stored on at least one of the one or more tangible storage devices, the program instructions executable by a processor. The computer program product may include program instructions to identify at least one collection object within a collection framework of a virtual machine. The computer program product may also include program instructions to determine the at least one identified collection object satisfies at least one preconfigured criteria. The computer program product may further include program instructions to determine a garbage collection cycle count associated with the at least one identified collection object exceeds a preconfigured threshold. The computer program product may also include program instructions to determine an occupancy ratio associated with the at least one identified collection object is less than a preconfigured shrink threshold. The computer program product may further include program instructions to restructure the at least one identified collection object based on the at least one identified collection object satisfying the at least one preconfigured criteria, the garbage collection cycle count exceeding the preconfigured threshold, and the occupancy ratio being less than the preconfigured shrink threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to virtual machine garbage collection. The following described exemplary embodiments provide a system, method, and program product to, among other things, automatically resize a collection instance by identifying execution points in a virtual machine. Therefore, the present embodiment has the capacity to improve the technical field of virtual machine garbage collection by allowing a collection instance to hold elements in an efficient manner and reduce the overhead of untimely resizing of the collection instance.

As previously described, garbage collection in a virtual machine environment, such as a Java virtual machine, relates to an automatic part of a process that manages runtime memory used by the program. Garbage collection may relieve programmer overhead required to manually deallocate resources in a program. The Java collections framework provides an efficient organization and utilization of real world data with the garbage collector providing enhanced allocation, deallocation mechanisms to it. The Java collections framework may be a group of classes and interfaces implementing a set of frequently used and reusable data structures.

The Java collections framework may be a powerful non-persistent data organization architecture, which provides software modules with a high degree of reusability. The reusability aspect of the Java collections framework may be prominent due to the rich set of features best suited for the recording, retrieving, and processing of user defined, heterogeneous data records. The heterogeneity of the records may be in relation to the type, content, and volume of the data. Among other things, one of the vital features of the collection instances is the dynamic growth, which allows a collection object to be internally resized to contain new entry requests transparent to the user.

To achieve internal, manual resizing, many techniques implement an internal data structure, such as an array. When created, the data structure may be sized so as to hold the current elements present within the Java collections framework. When more elements are added, a larger data structure may be created to allow for expansion. For this type of resizing, the elements within the original data structure may be copied from the original, smaller data structure to the new, larger data structure. Once the new data structure is created and populated, the original data structure may be discarded. The new data structure may be kept as the internal buffer for the Java collections framework and used for further collection operations.

If elements are continuously added to the Java collection instance, creation of a new data structure each time elements are added may be recursive and demanding on system resources. Additionally, when elements are removed from the Java collections framework, many common methods of collection do not track holes produced in the backing array. Therefore, when a data structure array becomes very large in relation to the elements within the data structure array, shrinking of the data structure array to efficiently accommodate the objects may be needed. As such, it may be advantageous, among other things, to implement a collection system that identifies execution points in a Java virtual machine instance where a collection instance may be automatically resized to store elements in an efficient manner while reducing the overhead of untimely resizing.

Garbage collection is a powerful feature in modern languages, including Java. The memory management within the language runtime may identify the memory crunch in the program and may initiate a collection operation at a pre-defined point where the application threads are temporarily frozen to accommodate the memory restructure. At any given point in time during the execution of a program, garbage collection roughly corresponds to the memory demanding situations in the application. Garbage collection may include three phases during the implementation of a virtual machine, such as a marking phase, a sweeping phase, and a compaction phase. The marking phase may traverse through live objects by inspecting the defining class type of each object encountered. Since some class types implement collection behaviors and some class types do not, determining the class type of an encountered object may identify whether the encountered object is also a collection type object.

According to one embodiment, objects within a data structure may be identified as collection type objects by traversing the data structure and determining whether a defining object class implements a collection interface. A collection data structure may then be resized at identified garbage collection points based on preconfigured criteria. The garbage collection points may be identified by tracking the operations that occurred to an object, such as a historical pattern of object insertions, deletion of elements, and resizing history.

Each modification to the collection, including variants of additions and variants of deletions mapping to one operation, may be tracked using a scalar counter within the object. The scalar counter value may be cached at each garbage collection point within the same object. Another scalar value may be employed to track the number of garbage collection cycles through which the modification counter remained constant. If the modification count that was cached remains the same as the current modification count after a predefined number of garbage collection cycles (e.g. 32 garbage collection cycles) and the occupancy ratio of the collection is below a predefined threshold (e.g. 70%) then the collection may be shrunk by creating a new backing structure with the size equal to the current occupation, copying the old content into the new structure, and discarding the old structure. Each time a modification is made to the collection, the cached value and the garbage collection count may be reset. Since a collection that has not been modified for a specified number of consecutive collection cycles and has been under-utilized during each collection cycle may possess a tendency to remain in the same state in the future, the collection may be restructured so unwanted memory within the structure can be reclaimed into the system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to implement a garbage collection system that identifies execution points in a virtual machine instance where a java collection instance may be resized to store elements in an efficient manner while reducing the overhead of untimely resizing. According to at least one implementation, counters may be implemented in various java collection instances to monitor the memory demands during a preconfigure series of garbage collection cycles. If the memory demands of the system remain below a preconfigured occupancy ratio for the preconfigured number of garbage collection cycles, the collection structure may be automatically resized to efficiently accommodate the demands of the application process.

Figure 1:
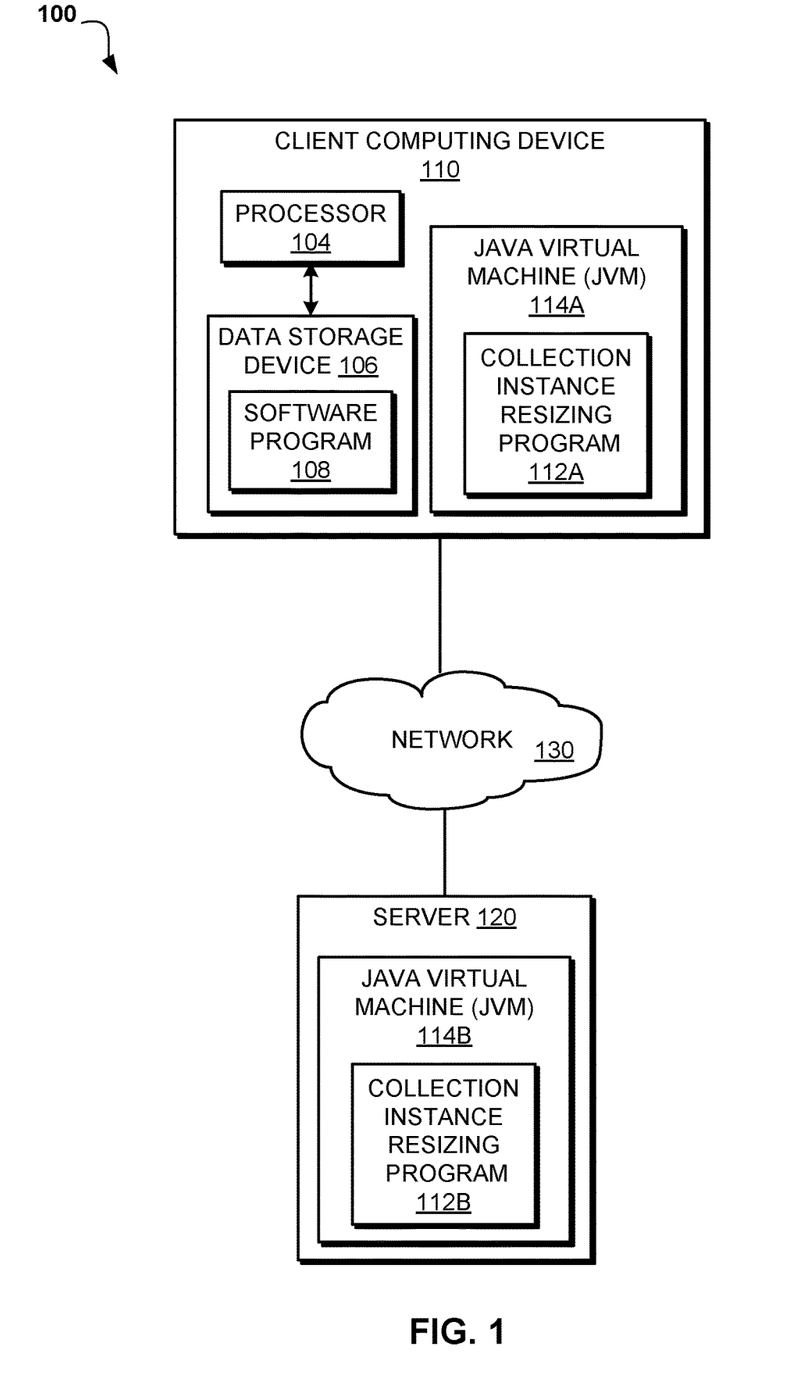
FIG. 1 is an exemplary networked computer environment, in accordance with one embodiment of the present invention.

Referring to FIG. 1, an exemplary networked computer environment 100 is depicted, in accordance with one embodiment. The networked computer environment 100 may include a client computing device 110 and a server 120 interconnected via a communication network 130. According to at least one implementation, the networked computer environment 100 may include a plurality of client computing devices 110 and servers 120, only one of each being shown for illustrative brevity.

The communication network 130 may include various types of communication networks, such as a wide area network (WAN), local area network (LAN), a telecommunication network, a wireless network, a public switched network and/or a satellite network. The communications network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 110 may include a processor 104 and a data storage device 106 that is enabled to host a software program 108, a Collection Instance Resizing Program 112A and a Java Virtual Machine (JVM) 114A, and communicate with the server 120 via the network 130, in accordance with one embodiment of the invention. The client computing device 110 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 110 may include internal components 502a and external components 504a, respectively.

The server computer 120 may be a laptop computer, netbook computer, personal computer (PC), a desktop computer, or any programmable electronic device capable of hosting a Collection Instance Resizing Program 112B and a Java Virtual Machine (JVM) 114B and communicating with the client computing device 110 via the network 130, in accordance with embodiments of the invention. As will be discussed with reference to FIG. 5, the server computer 120 may include internal components 502b and external components 504b, respectively. The server 120 may also operate in a cloud computing service model, such as Software as a Service (SaaS), Platform as a Service (PaaS), or Infrastructure as a Service (IaaS). The server 120 may also be located in a cloud computing deployment model, such as a private cloud, community cloud, public cloud, or hybrid cloud.

According to the present embodiment, the Collection Instance Resizing Program 112A, 112B may be a program capable of resizing a collection data structure based on comparison of preconfigured criteria, such as an unchanged occupancy ratio below a shrinkage threshold value but over a threshold garbage collection count, a changed occupancy ratio still within the shrinkage threshold with a rate of addition less than a rate of deletion, a changed occupancy ratio within the shrinkage threshold to warrant a negative resizing to save memory. The Collection Instance Resizing Program 112A, 112B is explained in further detail below with respect to FIG. 2, FIG. 3, and FIG. 4.

Figure 2:
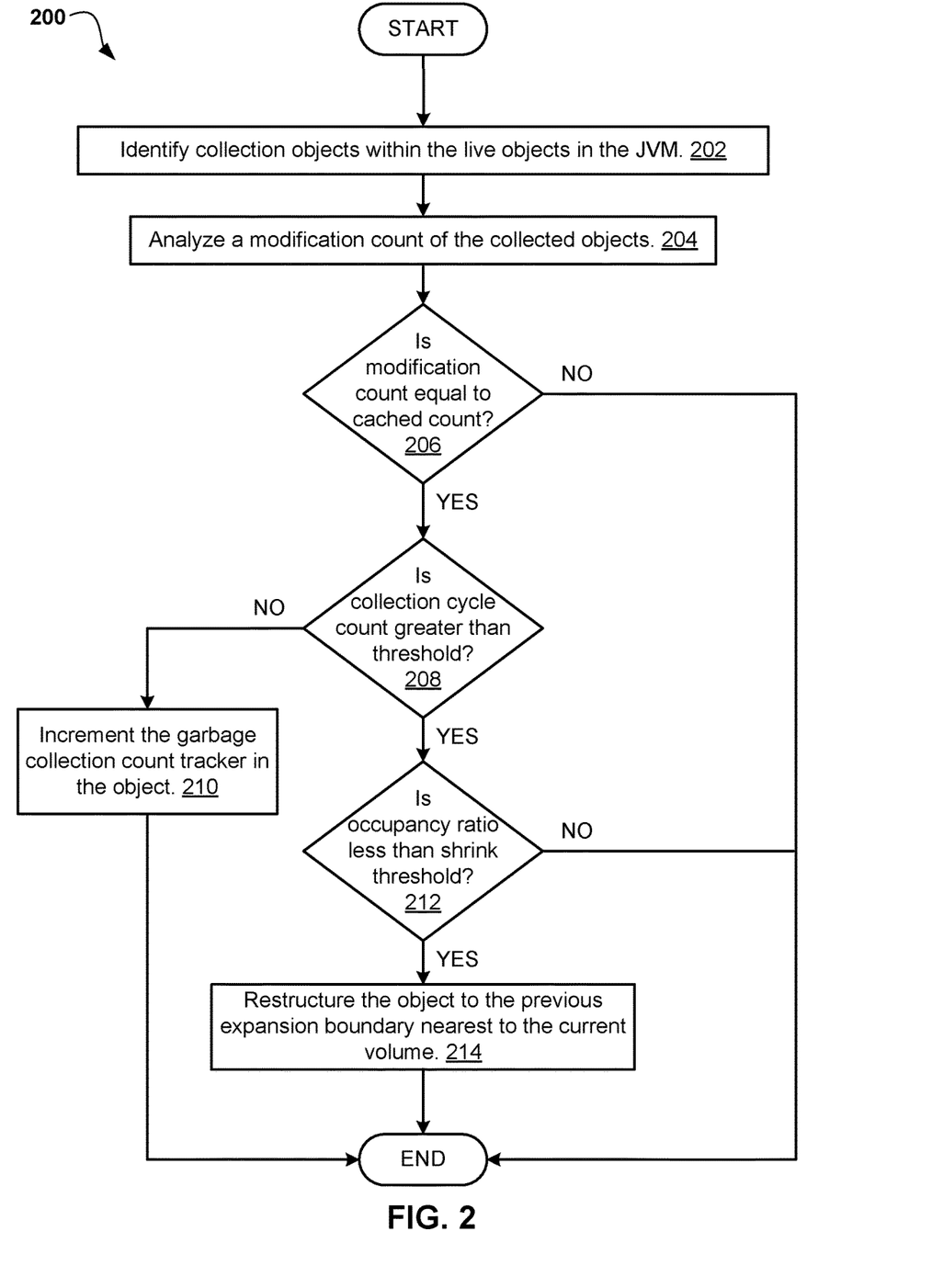
FIG. 2 illustrates a modification count tracking system flowchart of the operational steps carried out by a program to negatively resize a collection instance, in accordance with one embodiment of the present invention.

Referring now to FIG. 2, a modification count tracking system flowchart 200 of the operational steps carried out by a program to negatively resize a collection instance is depicted, in accordance with one embodiment of the present invention. The modification count tracking system flowchart 200 may demonstrate negatively resizing a collection object based on a predefined threshold size for the occupancy ratio of a collection by tracking each modification to the collection object and tracking garbage collection cycles, which the collection object survived, without undergoing any modification. At 202, the Collection Instance Resizing Program 112A, 112B (FIG. 1) identifies the collection objects from all live objects stored within the JVM 114A, 114B (FIG. 1). A live object within a collection instance may relate to elements actively stored within the memory of the JVM 114A, 114B (FIG. 1). The Collection Instance Resizing Program 112A, 112B (FIG. 1) may identify the live objects stored in memory within the JVM 114A, 114B (FIG. 1) from all stored objects. The Collection Instance Resizing Program 112A, 112B (FIG. 1) may then analyze the identified live objects to, in turn, identify the collection type objects (i.e. collection objects) stored within the JVM 114A, 114B (FIG. 1). By traversing all live objects to identify the collection objects, the Collection Instance Resizing Program 112A, 112B (FIG. 1) may be capable of determining which collection objects may be eligible for garbage collection.

Next at 204, the Collection Instance Resizing Program 112A, 112B (FIG. 1) analyzes a modification count of the collected objects. The Collection Instance Resizing Program 112A, 112B (FIG. 1) analyzes the modification count of the identified collection objects by comparing the modification count of each identified collection object with a cached count associated with each identified collection object. The Collection Instance Resizing Program 112A, 112B (FIG. 1) may track each modification made to each identified collection object by utilizing a scalar counter. The scalar counter may increment by one whenever a modification is made to an identified collection object. The value of the scalar counter is cached at each garbage collection point within the same identified collection object upon the completion of a garbage collection cycle. For example, when a modification is made to an identified collection object for the first time, the scalar counter implemented by the Collection Instance Resizing Program 112A, 112B (FIG. 1) may increment the modification count by one unit. If this is the only modification made to the identified collection object during the current garbage collection cycle, the Collection Instance Resizing Program 112A, 112B (FIG. 1) may cache the modification count equaling one modification. Additionally, the Collection Instance Resizing Program 112A, 112B (FIG. 1) may reset the cached value and a garbage collection cycle count each time a modification is made to the collection. The garbage collection cycle count may be recorded by another tracker to record the number of garbage collection cycles a java collection instance may encounter without a modification being made to the data structure.

Then at 206, the Collection Instance Resizing Program 112A, 112B (FIG. 1) determines whether the modification count is equal to the cached count. According to one implementation, the method may continue along the modification count tracking system flowchart 200, if the modification count is equal to the cached count. If the Collection Instance Resizing Program 112A, 112B (FIG. 1) determines the modification count is equal to the cached count (step 206, "YES" branch), the Collection Instance Resizing Program 112A, 112B (FIG. 1) may continue to step 208 to determine if the garbage collection cycle count is greater than a preconfigured threshold value. If the Collection Instance Resizing Program 112A, 112B (FIG. 1) determines the modification count is not equal to the cached count (step 206, "NO" branch), the Collection Instance Resizing Program 112A, 112B (FIG. 1) may reset the scalar counters of the collection instance and terminate since modifications may have been made to the identified collection objects within the collection instance. Therefore, restructuring the collection instance may not be needed.

If the Collection Instance Resizing Program 112A, 112B (FIG. 1) determines the modification count is the same as the cached count, then there may not be any modification changes to the identified collection objects from the last garbage collection point to the current garbage collection point. When no modifications to the data structure are made, the Collection Instance Resizing Program 112A, 112B (FIG. 1) may determine resizing of the data structure is necessary since the memory demand of the program executed within the JVM 114A, 114B (FIG. 1) may be lower than the allocated memory.

Next at 208, the Collection Instance Resizing Program 112A, 112B (FIG. 1) determines whether the garbage collection cycle count for the garbage collection instance is greater than a preconfigured threshold value, such as 32 garbage collection cycles. As previously described, a garbage collection cycle count tracker may be utilized to record the number of garbage collection cycles a garbage collection instance may encounter without a modification being made to the data structure. According to one implementation, the method may continue along the modification count tracking system flowchart 200, if the garbage collection cycle count is greater than the preconfigured threshold value. When the garbage collection cycle count reaches a value greater than the preconfigured threshold value, then the Collection Instance Resizing Program 112A, 112B (FIG. 1) may determine that the application hosted within JVM 114A, 114B (FIG. 1) has been under memory constraint for a period equivalent to the preconfigured threshold value and may effectively be considered dormant with respect to modifications. If the Collection Instance Resizing Program 112A, 112B (FIG. 1) determines the garbage collection cycle count is greater than the preconfigured threshold value (step 208, "YES" branch), the Collection Instance Resizing Program 112A, 112B (FIG. 1) may continue to step 212 to determine if the occupancy ratio is less than the shrink threshold. If the Collection Instance Resizing Program 112A, 112B (FIG. 1) determines the garbage collection cycle count is not greater than the preconfigured threshold value (step 208, "NO" branch), the Collection Instance Resizing Program 112A, 112B (FIG. 1) may continue to step 210 to increment the garbage collection count tracker in the object. For example, if the preconfigured threshold value is 32 garbage collection cycles, the Collection Instance Resizing Program 112A, 112B (FIG. 1) may proceed to determine if the occupancy ratio is less than the shrink threshold value when the garbage collection count is greater than 32. Similarly, the Collection Instance Resizing Program 112A, 112B (FIG. 1) may proceed to increment the collection cycle count by one unit when the garbage collection count is less than 32.

Then at 210, the Collection Instance Resizing Program 112A, 112B (FIG. 1) increments the garbage collection count tracker in the object by one unit. If the Collection Instance Resizing Program 112A, 112B (FIG. 1) determines that the garbage collection cycle count is below the preconfigured threshold, the Collection Instance Resizing Program 112A, 112B (FIG. 1) may need to increment the garbage collection count tracker by one unit to account for the current garbage collection cycle when performing future garbage collection cycles. For example, if the Collection Instance Resizing Program 112A, 112B (FIG. 1) determines a current garbage collection cycle is the fifth consecutive garbage collection cycle where the modification count is equal to the cached count, which means no modifications have been made to the identified collection objects in five garbage collection cycles, then the Collection Instance Resizing Program 112A, 112B (FIG. 1) may increment the garbage collection count tracker by one unit to indicate that five garbage collection cycles have been performed where no modifications have been made to the collection objects. Upon incrementing the garbage collection count tracker in the object by one unit, the Collection Instance Resizing Program 112A, 112B (FIG. 1) may terminate.

Next at 212, the Collection Instance Resizing Program 112A, 112B (FIG. 1) determines whether the occupancy ratio is less than the shrink threshold. The occupancy ratio may be actively used memory by the JVM 114A, 114B (FIG. 1) compared to the total available memory within the collection instance. The shrink threshold may be a preconfigured threshold value relating to the actively used memory in the JVM 114A, 114B (FIG. 1) in relation to the total available memory within the collection instance. When the occupancy ratio falls below the preconfigured shrink threshold, the Collection Instance Resizing Program 112A, 112B (FIG. 1) may determine the collection instance may be resized. According to one implementation, the method may continue along the modification count tracking system flowchart 200, if the occupancy ratio is less than the shrink threshold. If the Collection Instance Resizing Program 112A, 112B (FIG. 1) determines the occupancy ratio is less than the shrink threshold (step 212, "YES" branch), the Collection Instance Resizing Program 112A, 112B (FIG. 1) may continue to step 214 to restructure the object to the previous expansion boundary nearest to the current volume. If the Collection Instance Resizing Program 112A, 112B (FIG. 1) determines the occupancy ratio is not less than the shrink threshold (step 212, "NO" branch), the Collection Instance Resizing Program 112A, 112B (FIG. 1) may reset the scalar counters with respect to the collection instance in question and terminate. For example, if the preconfigured shrink threshold is set to 70% of the total collection instance, then the Collection Instance Resizing Program 112A, 112B (FIG. 1) may determine to shrink the collection instance when the occupancy ratio of the actively used memory to total collection instance size falls below 70%.

Then at 214, the Collection Instance Resizing Program 112A, 112B (FIG. 1) restructures the object to the previous expansion boundary nearest to the current volume. When the Collection Instance Resizing Program 112A, 112B (FIG. 1) determines the modification count and the cached count have been equal for the preconfigured number of garbage collection cycles and the occupancy ratio has fallen below the preconfigured shrink threshold, then the Collection Instance Resizing Program 112A, 112B (FIG. 1) may restructure (e.g. shrink) the collection instance since a collection instance that meets these criteria may have a continued tendency to be under-utilized in the future. Therefore, the Collection Instance Resizing Program 112A, 112B (FIG. 1) may restructure the collection instance in order to reclaim unwanted system memory. The Collection Instance Resizing Program 112A, 112B (FIG. 1) may restructure the collection instance by creating a new backing structure with a size equal to the current occupation volume. Content currently stored on the old structure may be copied to the newly created structure. Furthermore, the old structure may be discarded or deleted since the new structure may be a more efficient use of resources for the JVM 114A, 114B (FIG. 1). Additionally, the Collection Instance Resizing Program 112A, 112B (FIG. 1) may reset each scalar counter (i.e. tracker) when the collection instance is shrunk. Therefore, the Collection Instance Resizing Program 112A, 112B (FIG. 1) may be capable of monitoring the collection instance for a new resizing if the previously described criteria (i.e. modification count equal to cached count, garbage collection count equal to a preconfigured value, and occupancy ratio less than the preconfigured shrink threshold) are satisfied. Upon restructuring the object to the previous expansion boundary nearest to the current volume, the Collection Instance Resizing Program 112A, 112B (FIG. 1) may terminate.

It may be appreciated that FIG. 2 provides only an illustration of one implementation and does not imply any limitations with regard to how different embodiments may be implemented. Many modifications to the depicted environments may be made based on design and implementation requirements. For example, although the present embodiment is described with respect to a Java virtual machine, any type of virtual machine, such as a Parrot virtual machine and Microsoft® .NET Framework (Microsoft and all Microsoft-based trademarks and logos are trademarks or registered trademarks of Microsoft Corporation and/or its affiliates) may be used during implementation.

Figure 3:
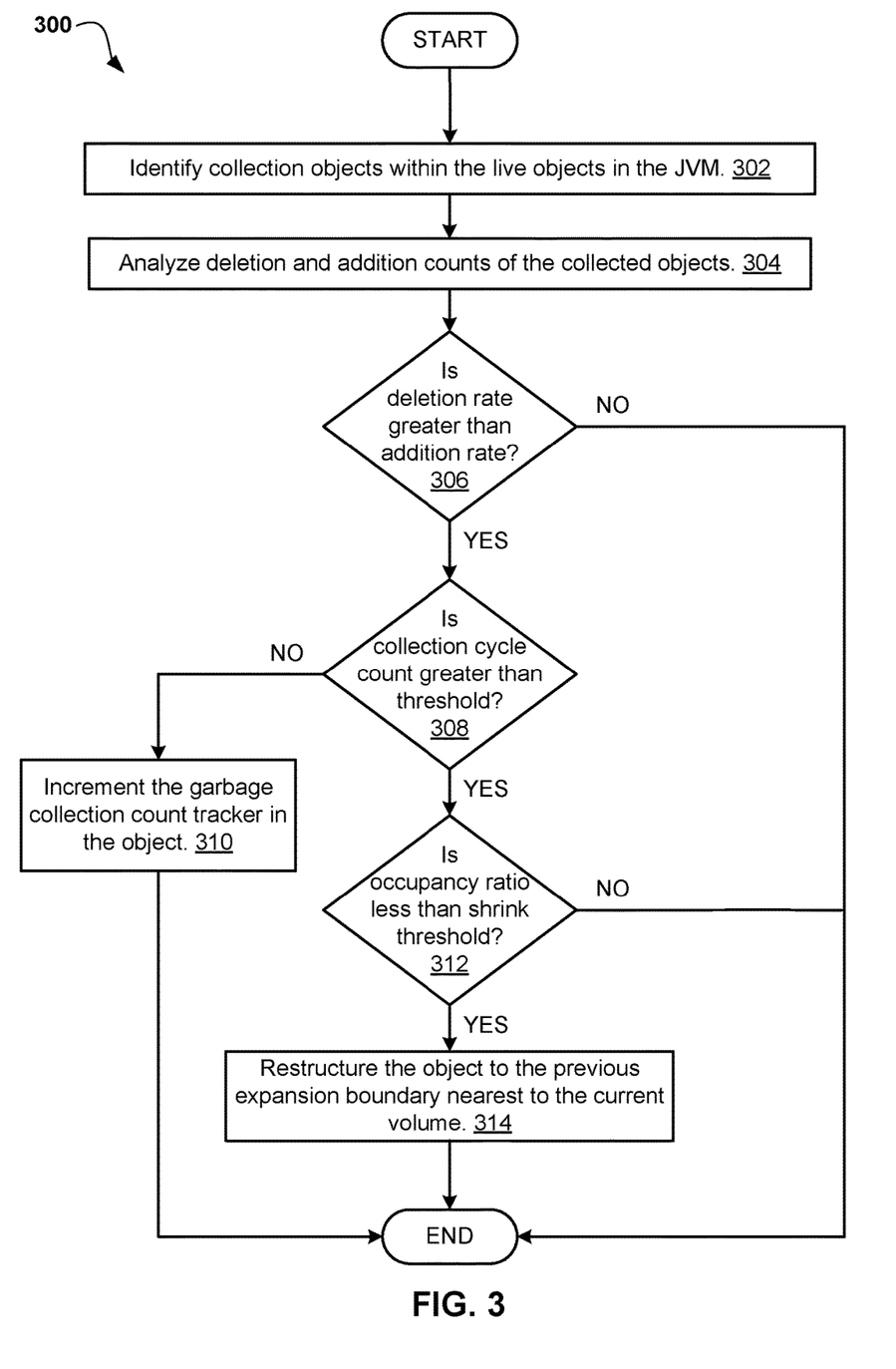
FIG. 3 illustrates a deletion rate to addition rate comparison flowchart of the operational steps carried out by a program to negatively resize a collection instance, in accordance with one embodiment of the present invention.

Referring now to FIG. 3, a deletion rate to addition rate comparison flowchart 300 of the operational steps carried out by a program to negatively resize a collection instance is depicted, in accordance with one embodiment of the present invention. The deletion rate to addition rate comparison flowchart 300 may demonstrate a method to negatively resize the collection based on a predefined threshold size for the occupancy ratio of the collection, when an addition rate of a collection object is less than the deletion rate of the collection object. At 302, the Collection Instance Resizing Program 112A, 112B (FIG. 1) identifies the collection objects from all live objects stored within the JVM 114A, 114B (FIG. 1). As previously described, a live object within a collection instance may relate to elements actively stored within the memory of the JVM 114A, 114B (FIG. 1). The Collection Instance Resizing Program 112A, 112B (FIG. 1) may identify the live objects stored in memory within the JVM 114A, 114B (FIG. 1) from all stored objects. The Collection Instance Resizing Program 112A, 112B (FIG. 1) may then analyze the identified live objects to, in turn, identify the collection type objects (i.e. collection objects) stored within the JVM 114A, 114B (FIG. 1). By traversing all live objects to identify the collection objects, the Collection Instance Resizing Program 112A, 112B (FIG. 1) may be capable of determining which collection objects may be eligible for garbage collection.

Next at 304, the Collection Instance Resizing Program 112A, 112B (FIG. 1) analyzes an addition count and a deletion count of the collected objects. The Collection Instance Resizing Program 112A, 112B (FIG. 1) may separately track the insertions and removals to the collection, and variants of insertions and removals to the collection, using two scalar counters within each collection object. The Collection Instance Resizing Program 112A, 112B (FIG. 1) may analyze the addition count and deletion count of the identified collection objects tracked by the scalar counters by comparing the addition count and deletion count of each identified collection object with a cached count of modifications associated with each identified collection object. Each scalar counter may increment the addition count or deletion count by one whenever a corresponding addition or deletion is made to an identified collection object. The value of each scalar counter is cached at each garbage collection point within the same identified collection object upon the completion of a garbage collection cycle. For example, when a deletion is made to an identified collection object for the first time, the scalar counter implemented by the Collection Instance Resizing Program 112A, 112B (FIG. 1) to track deletions may increment the deletion count by one unit. If this is the only deletion made to the identified collection object during the current garbage collection cycle, the Collection Instance Resizing Program 112A, 112B (FIG. 1) may cache the deletion count equaling one deletion. Furthermore, the Collection Instance Resizing Program 112A, 112B (FIG. 1) may calculate a deletion rate and an addition rate by using the deletion count and the addition count tracked by the scalar counters over a period of time. Additionally, the Collection Instance Resizing Program 112A, 112B (FIG. 1) may reset the cached value and the garbage collection cycle count each time the deletion rate is greater than the addition rate. As previously described, the garbage collection cycle count may be recorded by a tracker to record the number of garbage collection cycles a garbage collection instance may encounter without a modification being made to the data structure.

Then at 306, the Collection Instance Resizing Program 112A, 112B (FIG. 1) determines whether the deletion rate is greater than the addition rate. According to one implementation, the method may continue along the deletion rate to addition rate comparison flowchart 300, if the deletion rate is greater than the addition rate. If the Collection Instance Resizing Program 112A, 112B (FIG. 1) determines the deletion count is greater than the addition count (step 306, "YES" branch), the Collection Instance Resizing Program 112A, 112B (FIG. 1) may continue to step 308 to determine if the garbage collection cycle count is greater than a preconfigured threshold value. If the Collection Instance Resizing Program 112A, 112B (FIG. 1) determines the deletion count is not greater than the addition count (step 306, "NO" branch), the Collection Instance Resizing Program 112A, 112B (FIG. 1) may reset the counters for the collection object and terminate since modifications may have been made to the identified collection objects within the collection instance. Therefore, restructuring the collection instance may not be needed. In another embodiment, the Collection Instance Resizing Program 112A, 112B (FIG. 1) may compare the rate of deletion to the rate of addition to each collection object.

If the Collection Instance Resizing Program 112A, 112B (FIG. 1) determines the deletion count is the greater than the addition count, then there may not be any modification changes to the identified collection objects from the last garbage collection point to the current garbage collection point. In fact, when the deletion count is greater than the addition count, the Collection Instance Resizing Program 112A, 112B (FIG. 1) may determine that less memory allocated to the collection object is needed since more entries are being deleted than are being added to the collection object. When no deletions to an object exceed the additions, the Collection Instance Resizing Program 112A, 112B (FIG. 1) may determine resizing of the data structure is necessary since the memory demand of the program executed within the JVM 114A, 114B (FIG. 1) may be lower than the allocated memory.

Next at 308, the Collection Instance Resizing Program 112A, 112B (FIG. 1) determines whether the garbage collection cycle count for the garbage collection instance is greater than a preconfigured threshold value, such as 32 garbage collection cycles. As previously described, the garbage collection cycle count tracker may be utilized to record the number of garbage collection cycles a garbage collection instance may encounter without a modification being made to the data structure. According to one implementation, the method may continue along the deletion rate to addition rate comparison flowchart 300, if the garbage collection cycle count is greater than the preconfigured threshold value. When the garbage collection cycle count reaches a value greater than the preconfigured threshold value, then the Collection Instance Resizing Program 112A, 112B (FIG. 1) may determine that the application hosted within JVM 114A, 114B (FIG. 1) has been under memory constraint for a period equivalent to the preconfigured threshold value and may effectively be considered dormant with respect to modifications. If the Collection Instance Resizing Program 112A, 112B (FIG. 1) determines the garbage collection cycle count is greater than the preconfigured threshold value (step 308, "YES" branch), the Collection Instance Resizing Program 112A, 112B (FIG. 1) may continue to step 312 to determine if the occupancy ratio is less than the shrink threshold. If the Collection Instance Resizing Program 112A, 112B (FIG. 1) determines the garbage collection cycle count is not greater than the preconfigured threshold value (step 308, "NO" branch), the Collection Instance Resizing Program 112A, 112B (FIG. 1) may continue to step 310 to increment the garbage collection count tracker in the object. For example, if the preconfigured threshold value is 32 garbage collection cycles, the Collection Instance Resizing Program 112A, 112B (FIG. 1) may proceed to determine if the occupancy ratio is less than the shrink threshold value when the garbage collection count is greater than 32. Similarly, the Collection Instance Resizing Program 112A, 112B (FIG. 1) may proceed to increment the collection cycle count by one unit when the garbage collection count is less than 32.

Then at 310, the Collection Instance Resizing Program 112A, 112B (FIG. 1) increments the garbage collection count tracker in the object by one unit. If the Collection Instance Resizing Program 112A, 112B (FIG. 1) determines that the garbage collection cycle count is below the preconfigured threshold, the Collection Instance Resizing Program 112A, 112B (FIG. 1) may need to increment the garbage collection count tracker by one unit to account for the current garbage collection cycle when performing future garbage collection cycles. For example, if the Collection Instance Resizing Program 112A, 112B (FIG. 1) determines a current garbage collection cycle is the fifth consecutive garbage collection cycle where the deletion rate is greater than the addition rate, then the Collection Instance Resizing Program 112A, 112B (FIG. 1) may increment the garbage collection count tracker by one unit to indicate that five garbage collection cycles have been performed where the deletion rate is less than the addition rate have been made to the collection objects. Upon incrementing the garbage collection count tracker in the object by one unit, the Collection Instance Resizing Program 112A, 112B (FIG. 1) may terminate.

Next at 312, the Collection Instance Resizing Program 112A, 112B (FIG. 1) determines whether the occupancy ratio is less than the shrink threshold. The occupancy ratio may be actual actively used memory by the JVM 114A, 114B (FIG. 1) compared to the total available memory within the collection instance. The shrink threshold may be a preconfigured value relating to the actual actively used memory in the JVM 114A, 114B (FIG. 1) in relation to the total available memory within the collection instance. When the occupancy ratio falls below the preconfigured shrink threshold, the Collection Instance Resizing Program 112A, 112B (FIG. 1) may determine the collection instance may be resized. According to one implementation, the method may continue along the deletion rate to addition rate comparison flowchart 300, if the occupancy ratio is less than the shrink threshold. If the Collection Instance Resizing Program 112A, 112B (FIG. 1) determines the occupancy ratio is less than the shrink threshold (step 312, "YES" branch), the Collection Instance Resizing Program 112A, 112B (FIG. 1) may continue to step 314 to restructure the object to the previous expansion boundary nearest to the current volume. If the Collection Instance Resizing Program 112A, 112B (FIG. 1) determines the occupancy ratio is not less than the shrink threshold (step 312, "NO" branch), the Collection Instance Resizing Program 112A, 112B (FIG. 1) may reset the counters and terminate. For example, if the preconfigured shrink threshold is set to 70% of the total collection instance, then the Collection Instance Resizing Program 112A, 112B (FIG. 1) may determine to shrink the collection instance when the occupancy ratio of the actively used memory to total collection instance size falls below 70%.

Then at 314, the Collection Instance Resizing Program 112A, 112B (FIG. 1) restructures the collection object to the previous expansion boundary nearest to the current volume. When the Collection Instance Resizing Program 112A, 112B (FIG. 1) determines the deletion rate is greater than the addition rate and the occupancy ratio has fallen below the preconfigured shrink threshold, then the Collection Instance Resizing Program 112A, 112B (FIG. 1) may restructure (e.g. shrink) the collection instance since a collection instance that meets these criteria may have a continued tendency to be under-utilized in the future. Therefore, the Collection Instance Resizing Program 112A, 112B (FIG. 1) may restructure the collection instance in order to reclaim unwanted system memory. The Collection Instance Resizing Program 112A, 112B (FIG. 1) may restructure the collection instance by creating a new backing structure with a size equal to the current occupation volume. Content currently stored on the old structure may be copied to the newly created structure. Furthermore, the old structure may be discarded since the new structure may be a more efficient use of resources for the JVM 114A, 114B (FIG. 1). Additionally, the Collection Instance Resizing Program 112A, 112B (FIG. 1) may reset each scalar counter (i.e. tracker) when the collection instance is shrunk. Therefore, the Collection Instance Resizing Program 112A, 112B (FIG. 1) may be capable of monitoring the collection instance for a new resizing if the previously described criteria (i.e. deletion rate greater than addition rate, garbage collection count equal to a preconfigured value, and occupancy ratio less than the preconfigured shrink threshold) are satisfied. Upon restructuring the object to the previous expansion boundary nearest to the current volume, the Collection Instance Resizing Program 112A, 112B (FIG. 1) may terminate.

Figure 4:
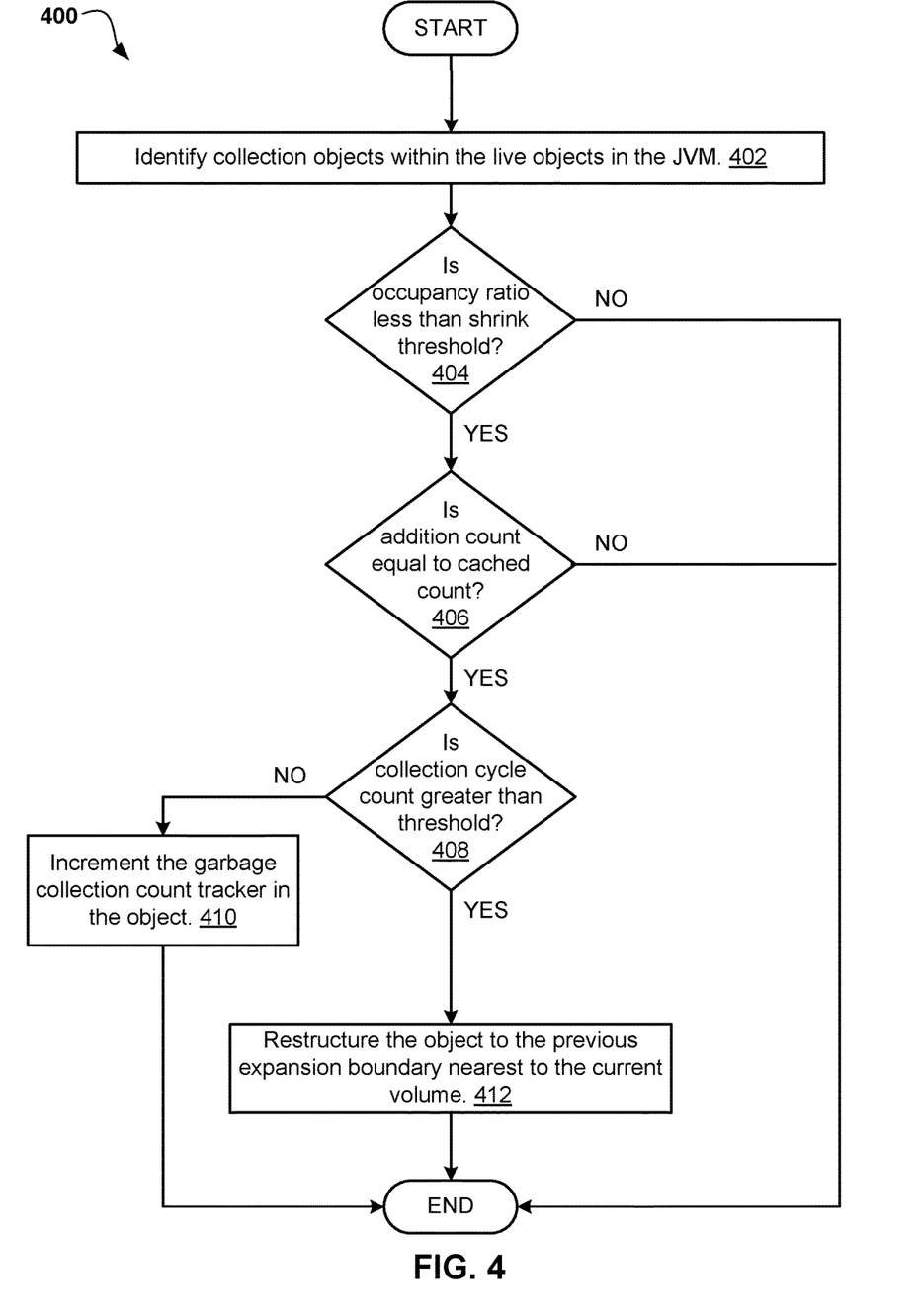
FIG. 4 illustrates an addition rate tracking flowchart of the operational steps carried out by a program to negatively resize a collection instance, in accordance with one embodiment of the present invention.

Referring now to FIG. 4, an addition rate tracking flowchart 400 of the operational steps carried out by a program to negatively resize a collection instance is depicted, in accordance with one embodiment of the present invention. The addition rate tracking flowchart 400 may demonstrate a method to negatively resizing the collection based on a predefined threshold size for the occupancy ratio of the collection and by tracking additions and an addition rate to collection objects thereby ensuring the addition rate is within a containment limit of a predefined shrinkage threshold for the collection. At 402, the Collection Instance Resizing Program 112A, 112B (FIG. 1) identifies the collection objects from all live objects stored within the JVM 114A, 114B (FIG. 1). As previously described, a live object within a collection instance may relate to elements actively stored within the memory of the JVM 114A, 114B (FIG. 1). The Collection Instance Resizing Program 112A, 112B

(FIG. 1) may identify the live objects stored in memory within the JVM 114A, 114B (FIG. 1) from all stored objects. The Collection Instance Resizing Program 112A, 112B (FIG. 1) may then analyze the identified live objects to, in turn, identify the collection type objects (i.e. collection objects) stored within the JVM 114A, 114B (FIG. 1). By traversing all live objects to identify the collection objects, the Collection Instance Resizing Program 112A, 112B (FIG. 1) may be capable of determining which collection objects may be eligible for garbage collection.

Next at 404, the Collection Instance Resizing Program 112A, 112B (FIG. 1) determines whether the occupancy ratio is less than the shrink threshold. As previously described, the occupancy ratio may be actual actively used memory by the JVM 114A, 114B (FIG. 1) compared to the total size of the collection instance. The shrink threshold may be a preconfigured value relating to the actual actively used memory in the JVM 114A, 114B (FIG. 1) in relation to the total size of the collection instance. When the occupancy ratio falls below the preconfigured shrink threshold, the Collection Instance Resizing Program 112A, 112B (FIG. 1) may determine the collection instance may be resized. According to one implementation, the method may continue along the addition rate tracking flowchart 400, if the occupancy ratio is less than the shrink threshold. If the Collection Instance Resizing Program 112A, 112B (FIG. 1) determines the occupancy ratio is less than the shrink threshold (step 404, "YES" branch), the Collection Instance Resizing Program 112A, 112B (FIG. 1) may continue to step 406 to determine whether the addition count is equal to the cached count. If the Collection Instance Resizing Program 112A, 112B (FIG. 1) determines the occupancy ratio is not less than the shrink threshold (step 404, "NO" branch), the Collection Instance Resizing Program 112A, 112B (FIG. 1) may reset the counters and terminate. For example, if the preconfigured shrink threshold is set to 70% of the total collection instance, then the Collection Instance Resizing Program 112A, 112B (FIG. 1) may determine to shrink the collection instance when the occupancy ratio of the actively used memory to total collection instance size falls below 70%.

Then at 406, the Collection Instance Resizing Program 112A, 112B (FIG. 1) determines whether the addition count is equal to the cached count. As previously described, the Collection Instance Resizing Program 112A, 112B (FIG. 1) may track the insertions to the collection using a scalar counter within each collection object. Unlike the embodiment described in FIG. 3, the present embodiment may not track deletions to the identified collection objects because, irrespective of any insertions or removals happening in the object, as long as the additions are not causing the occupancy ratio to cross the shrinkage limit the collection may still be under-utilized. Therefore, the Collection Instance Resizing Program 112A, 112B (FIG. 1) may implement a scalar counter to track additions to the collection but increment the counter only for additions when the collection is already above the preconfigured shrink threshold. The Collection Instance Resizing Program 112A, 112B (FIG. 1) may analyze the addition count of the identified collection objects tracked by the scalar counter by comparing the addition count of each identified collection object with a cached count of additions associated with each identified collection object. The value of each scalar counter is cached at each garbage collection point within the same identified collection object upon the completion of a garbage collection cycle. According to one implementation, the method may continue along the addition rate tracking flowchart 400, if the addition count is equal to the cached count. If the Collection Instance Resizing Program 112A, 112B (FIG. 1) determines the addition count is equal to the cached count (step 406, "YES" branch), the Collection Instance Resizing Program 112A, 112B (FIG. 1) may continue to step 408 to determine if the garbage collection cycle count is greater than a preconfigured threshold value. If the Collection Instance Resizing Program 112A, 112B (FIG. 1) determines the addition count is not equal to the cached count (step 406, "NO" branch), the Collection Instance Resizing Program 112A, 112B (FIG. 1) may terminate.

Next at 408, the Collection Instance Resizing Program 112A, 112B (FIG. 1) determines whether the garbage collection cycle count for the garbage collection instance is greater than a preconfigured threshold value, such as 32 garbage collection cycles. A garbage collection cycle count tracker may be utilized to record the number of garbage collection cycles a garbage collection instance may encounter without a modification being made to the data structure. According to one implementation, the method may continue along the addition rate tracking flowchart 400, if the garbage collection cycle count is greater than the preconfigured threshold value. When the garbage collection cycle count reaches a value greater than the preconfigured threshold value, then the Collection Instance Resizing Program 112A, 112B (FIG. 1) may determine that the application hosted within JVM 114A, 114B (FIG. 1) has been under memory constraint for a period equivalent to the preconfigured threshold value and may effectively be considered dormant with respect to modifications. If the Collection Instance Resizing Program 112A, 112B (FIG. 1) determines the garbage collection cycle count is greater than the preconfigured threshold value (step 408, "YES" branch), the Collection Instance Resizing Program 112A, 112B (FIG. 1) may continue to step 412 to restructure the object to the previous expansion boundary nearest to the current volume. If the Collection Instance Resizing Program 112A, 112B (FIG. 1) determines the garbage collection cycle count is not greater than the preconfigured threshold value (step 408, "NO" branch), the Collection Instance Resizing Program 112A, 112B (FIG. 1) may continue to step 410 to increment the garbage collection count tracker in the object. For example, if the preconfigured threshold value is 32 garbage collection cycles, the Collection Instance Resizing Program 112A, 112B (FIG. 1) may proceed to restructure the object to the previous expansion boundary nearest to the current volume when the garbage collection count is greater than 32. Similarly, the Collection Instance Resizing Program 112A, 112B (FIG. 1) may proceed to increment the collection cycle count by one unit when the garbage collection count is less than 32.

Then at 410, the Collection Instance Resizing Program 112A, 112B (FIG. 1) increments the garbage collection count tracker in the object by one unit. If the Collection Instance Resizing Program 112A, 112B (FIG. 1) determines that the garbage collection cycle count is below the preconfigured threshold, the Collection Instance Resizing Program 112A, 112B (FIG. 1) may need to increment the garbage collection count tracker by one unit to account for the current garbage collection cycle when performing future garbage collection cycles. For example, if the Collection Instance Resizing Program 112A, 112B (FIG. 1) determines a current garbage collection cycle is the fifth consecutive garbage collection cycle where the addition count is equal to the cached count, then the Collection Instance Resizing Program 112A, 112B (FIG. 1) may increment the garbage collection count tracker by one unit to indicate that five garbage collection cycles have been performed. Upon incrementing the garbage collection count tracker in the object by one unit, the Collection Instance Resizing Program 112A, 112B (FIG. 1) may terminate.

Then at 412, the Collection Instance Resizing Program 112A, 112B (FIG. 1) restructures the object to the previous expansion boundary nearest to the current volume. When the Collection Instance Resizing Program 112A, 112B (FIG. 1) determines the addition count and the cached count have been equal for the preconfigured number of garbage collection cycles and the occupancy ratio has fallen below the preconfigured shrink threshold, then the Collection Instance Resizing Program 112A, 112B (FIG. 1) may restructure (e.g. shrink) the collection instance since a collection instance that meets these criteria may have a continued tendency to be under-utilized in the future. Therefore, the Collection Instance Resizing Program 112A, 112B (FIG. 1) may restructure the collection instance in order to reclaim unwanted system memory. The Collection Instance Resizing Program 112A, 112B (FIG. 1) may restructure the collection instance by creating a new backing structure with a size equal to the current occupation volume. Content currently stored on the old structure may be copied to the newly created structure. Furthermore, the old structure may be discarded since the new structure may be a more efficient use of resources for the JVM 114A, 114B (FIG. 1). Additionally, the Collection Instance Resizing Program 112A, 112B (FIG. 1) may reset each scalar counter (i.e. tracker) when the collection instance is restructure. Therefore, the Collection Instance Resizing Program 112A, 112B (FIG. 1) may be capable of monitoring the collection instance for a new resizing if the previously described criteria (i.e. addition count equal to cached count, garbage collection count equal to a preconfigured value, and occupancy ratio less than the preconfigured shrink threshold) are satisfied. Upon restructuring the object to the previous expansion boundary nearest to the current volume, the Collection Instance Resizing Program 112A, 112B (FIG. 1) may terminate.

Figure 5:
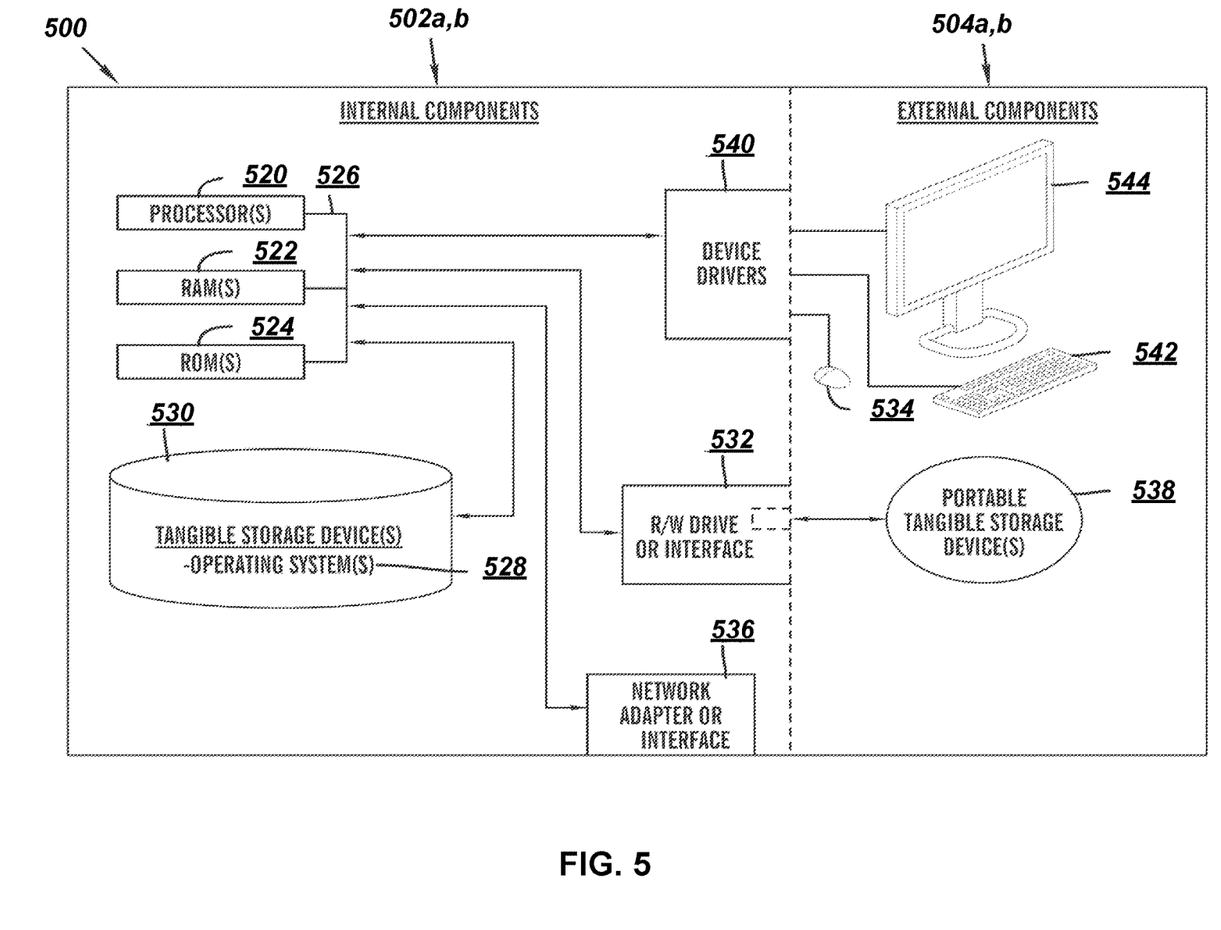
FIG. 5 is a block diagram of internal and external components of computers and servers depicted in FIG. 1 according to at least one embodiment.

FIG. 5 is a block diagram 500 of internal and external components of client computing device 110 and server 120 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 502, 504 is representative of any electronic device capable of executing machine-readable program instructions. Data processing system 502, 504 may be representative of a smart phone, a computer system, PDA, or other electronic devices. Examples of computing systems, environments, and/or configurations that may be represented by data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Client computing device 110 (FIG. 1) and server 120 (FIG. 1) may include respective sets of internal components 502 *a,b* and external components 504 *a,b* illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The one or more operating systems 528, the Collection Instance Resizing Program 112A (FIG. 1) and the JVM 114A (FIG. 1) in client computer 110 (FIG. 1), and the Collection Instance Resizing Program 112B (FIG. 1) and the JVM 114B (FIG. 1) in server 120 (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 *a,b* also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the Collection Instance Resizing Program 112A, 112B (FIG. 1) and the JVM 114A, 114B (FIG. 1), can be stored on one or more of the respective portable computer-readable tangible storage devices 538, read via the respective R/W drive or interface 532 and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. The Collection Instance Resizing Program 112A (FIG. 1) and JVM 114A (FIG. 1) in client computer 110 (FIG. 1) and the Collection Instance Resizing Program 112B (FIG. 1) and the JVM 114B (FIG. 1) in server 120 (FIG. 1) can be downloaded to client computer 110 (FIG. 1) and server 120 (FIG. 1) from an external computer via a network (for example, the Internet, a local area network or other, wide area network) and respective network adapters or interfaces 536. From the network adapters or interfaces 536, the Collection Instance Resizing Program 112A (FIG. 1) and the JVM 114A (FIG. 1) in client computer 110 (FIG. 1) and the Collection Instance Resizing Program 112B (FIG. 1) and the JVM 114B (FIG. 1) in server 120 (FIG. 1) are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
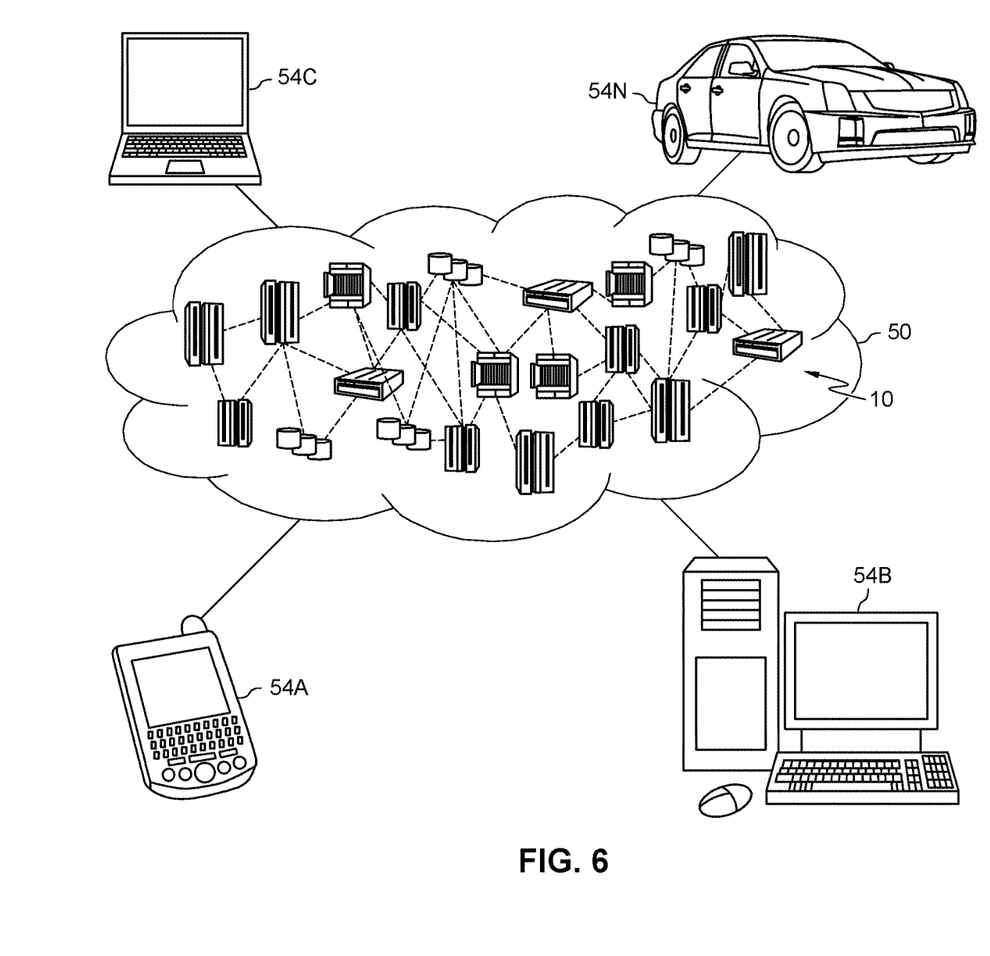
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
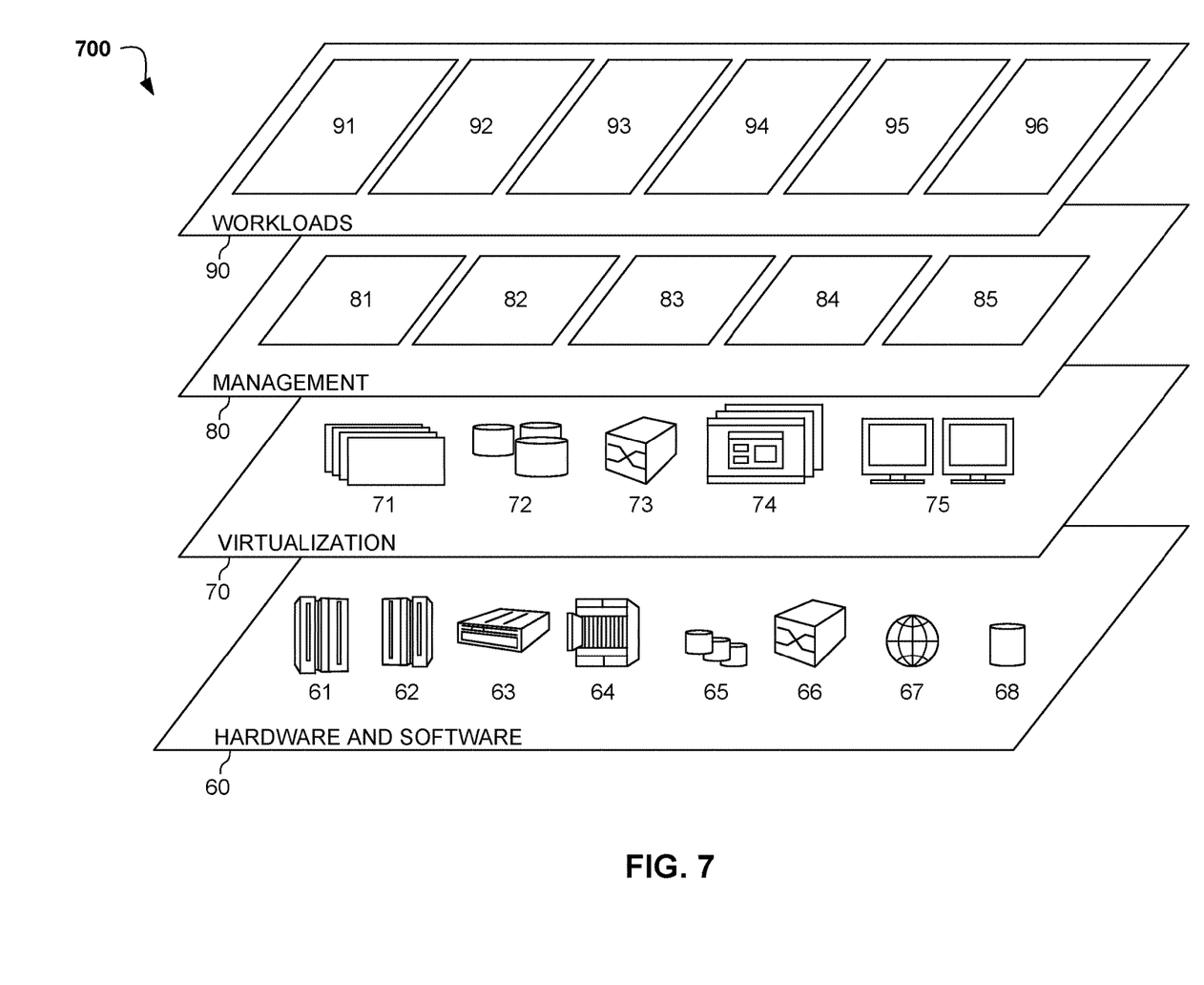
FIG. 7 depicts abstraction model layers according to an embodiment of the present invention.

Referring now to FIG. 7 a set of functional abstraction layers 700 provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collection instance resizing 96. Collection instance resizing 96 may refer to resizing a garbage collection instance based predefined criteria, such as a modification count associated with a collection object, a deletion rate associated with a collection object, an addition rate associated with a collection object, an occupancy ratio of a data structure in relation to a preconfigured shrink threshold, and a total number of garbage collection cycle count.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for collection instance resizing, the computer program product comprising:

one or more computer-readable tangible storage medium and program instructions stored on at least one of the one or more tangible storage medium, the program instructions executable by a processor, the program instructions comprising:

program instructions to identify at least one collection object among a plurality of live collection objects within a collection framework of a virtual machine, wherein the plurality of live collection objects relates to a plurality of elements actively stored with the virtual machine;

program instructions to determine a current modification count is equal to a cached count based on comparing the current modification count associated with the at least one identified collection object with a cached count associated with each at least one identified collection object, wherein the cached count is a record of a plurality of previous modifications to the at least one identified collection object during a previous garbage collection cycle kept by a scalar counter, and wherein the value of the scalar counter is cached at a garbage collection point within the at least one identified collection object upon a completion of a garbage collection cycle, and wherein the current modification count is a record of a plurality of current modifications to the at least one identified collection object during a current garbage collection cycle;

program instructions to determine a garbage collection cycle count associated with the at least one identified collection object exceeds a value of thirty-two, wherein the garbage collection cycle count is a tally of a plurality of completed garbage collection cycles by the collection framework;

program instructions to determine an occupancy ratio associated with the at least one identified collection object is less than a preconfigured shrink threshold, wherein the occupancy ratio is calculated as a plurality of actively used memory within the collection framework compared to a plurality of total available memory within the collection framework, and wherein the preconfigured shrink threshold is a preconfigured value relating to the plurality of actively used memory within the collection framework compared to the plurality of total available memory within the collection framework; and program instructions to restructure the at least one identified collection object based on determining the modification count is equal to the cached count, the garbage collection cycle count exceeds the value of thirty-two, and the occupancy ratio is less than the preconfigured shrink threshold, wherein restructuring the at least one identified collection object includes shrinking the at least one identified collection object to a previous expansion boundary nearest to a current volume of the at least one identified collection object by creating a new backing structure to the collection framework with a size equal to the current volume, copying a plurality of currently stored content on an old backing structure to the created new backing structure, and deleting the old backing structure, and wherein the scalar counter is reset when the at least one identified collection object is shrunk.

* * * * *